United States Patent [19]

Kindt-Larsen

[11] Patent Number: 5,094,609
[45] Date of Patent: Mar. 10, 1992

[54] CHAMBER FOR HYDRATING CONTACT LENSES

[75] Inventor: Ture Kindt-Larsen, Vedbaek, Denmark

[73] Assignee: Vistakon, Inc., Jacksonville, Fla.

[21] Appl. No.: 510,341

[22] Filed: Apr. 17, 1990

[51] Int. Cl.⁵ .............................................. B29D 11/00
[52] U.S. Cl. .................................... 425/445; 206/5.1; 264/2.6
[58] Field of Search ................ 425/445, 808; 264/2.3, 264/2.6; 206/5.1; 351/162

[56] References Cited

U.S. PATENT DOCUMENTS

| | | | |
|---|---|---|---|
| 3,115,146 | 12/1963 | Erwin | 206/5.1 |
| 3,221,083 | 11/1965 | Crandon | 264/2.6 |
| 3,361,858 | 1/1968 | Wichterle | 264/2.6 |
| 3,700,761 | 10/1972 | O'Driscoll et al. | 264/2.6 |
| 4,640,489 | 2/1987 | Larsen | 249/122 |
| 4,807,750 | 2/1989 | Ryder et al. | 206/5.1 |
| 4,860,885 | 8/1989 | Kaufman et al. | 206/5.1 |
| 4,890,729 | 1/1990 | Ranalletta | 206/5.1 |

FOREIGN PATENT DOCUMENTS

| | | | |
|---|---|---|---|
| 2902549 | 8/1979 | Fed. Rep. of Germany | 206/5.1 |
| 48-3151 | 1/1973 | Japan | 206/5.1 |
| 1130853 | 10/1968 | United Kingdom | 206/5.1 |
| 1403667 | 8/1975 | United Kingdom | 206/5.1 |

Primary Examiner—James C. Housel
Attorney, Agent, or Firm—Paul Coletti; Joel Petrow

[57] ABSTRACT

Male and female members for contact lenses where either member is able to hold the contact lens as it moves from station to station during the hydration process. The female member fits together with the male member forming a chamber. Each of the members contains a line centrally located so that both surfaces of the contact lens are flushed during the hydration process, and drainage takes place radially on the outside of the mated male and female chamber members. These members may be produced on a frame with a plurality of members, usually eight to a frame, to allow ease of processing. Full automation is possible, and complete and positive lens control during any step of the process through the packaging step is achieved.

19 Claims, 7 Drawing Sheets

CHAMBER FOR HYDRATING CONTACT LENSES

FIELD OF THE INVENTION

This invention relates to new and improved chambers for the manufacture of soft contact lenses. More particularly, the invention pertains to chambers prepared from metal or plastic materials which can be effectively employed for the continuous or semi-continuous hydration of one or a plurality of essentially polymerized soft contact lenses.

BACKGROUND OF THE INVENTION

The increase of the popularity of the soft contact lenses has led to many proposals for their manufacture. This is especially true because current contact lens manufacture employs a number of discrete processing steps. First, a monomer, of an appropriate material having good optical properties when polymerized, is placed into a female mold. A male member is then placed over the mold, much as described in U.S. Pat. No. 4,640,489. The monomer is then polymerized by exposing the mold to ultraviolet light or by heat.

After polymerization, the lens is removed from the mold and hydrated by immersion in a bath. Generally this bath is comprised of a buffered salt solution with a surfactant. After hydration, the lens is washed and placed in a saline solution. Thereafter, the finished lens is packaged and made available for consumer use.

It has been recognized however, that current hydration processes can be quite long and time consuming. After placing the lenses in a wash tank, the lenses must be drained, rinsed and brought to equilibrium in an isotonic saline solution.

Current hydration processes use large volumes of water contained in several large tanks through which the lenses must be moved by large machinery. During processing the lens may sometimes become inverted. In these instances it will be necessary for a worker to touch the lenses to reinvert them. This is especially true in systems where lenses are manually transferred to the final package. This human interface is slow, expensive, and can damage the lens.

SUMMARY OF THE INVENTION

Accordingly, it is one of the objects of the invention to provide a washing and hydration process where the volume of solution used to wash, and the volume of water used to hydrate the lenses is reduced. Currently, washing and hydration takes place in large vessels where the lens is essentially uncontrolled.

It is another object to remove leachables with water, alcohol, other organic solvents, or a mixture thereof, thus flushing unreacted monomers, catalyst and/or partially reacted comonomers or other impurities.

It is a further object of the invention to reduce the chemicals used in the hydration process. Currently, because the hydration solution is a buffered salt water solution, the hydration process requires significant quantities of chemicals.

It is another object of the invention to reduce the time in which the wash and hydration steps take place.

It is another object of the invention to eliminate the possibility of inversion or rolling over of the lenses during processing and packaging.

These and other objects of the invention are accomplished in a chamber which is used in an improved hydration process. The chamber contains a male and female member. The male member is insertable within the female member such that there is clearance for a soft contact lens between the two members, yet not enough so that the contact lens can invert, or fold over. The chamber contains a conduit for washing and hydrating the lenses. Such a conduit is found on both sides of the chamber, so that solution flow takes place on both surfaces of the lens, in a radial direction surrounding the lens. One of the members contains a drainage system where solution and leachable substances like unreacted monomer or catalyst and partially reacted comonomers processing debris or other impurities may be removed circumferentially from the lens.

The present invention is most useful in exchanging diluent for water and removing impurities while hydrating a lens by the process described in my copending application Ser. No. 07/510,325 entitled "Process for Hydrating Soft Contact Lenses", filed on Apr. 17, 1990. The chamber may be placed within an array made to adapt to current manufacturing systems, so that a plurality of lenses can be processed simultaneously using a small and controlled volumes of washing and hydration solutions.

These and other aspects of the invention will be better understood in connection with the detailed description of the drawings and detailed description of the invention, which follow:

DETAILED DESCRIPTION OF THE DRAWINGS

DETAILED DESCRIPTION OF THE INVENTION

Figure 1:
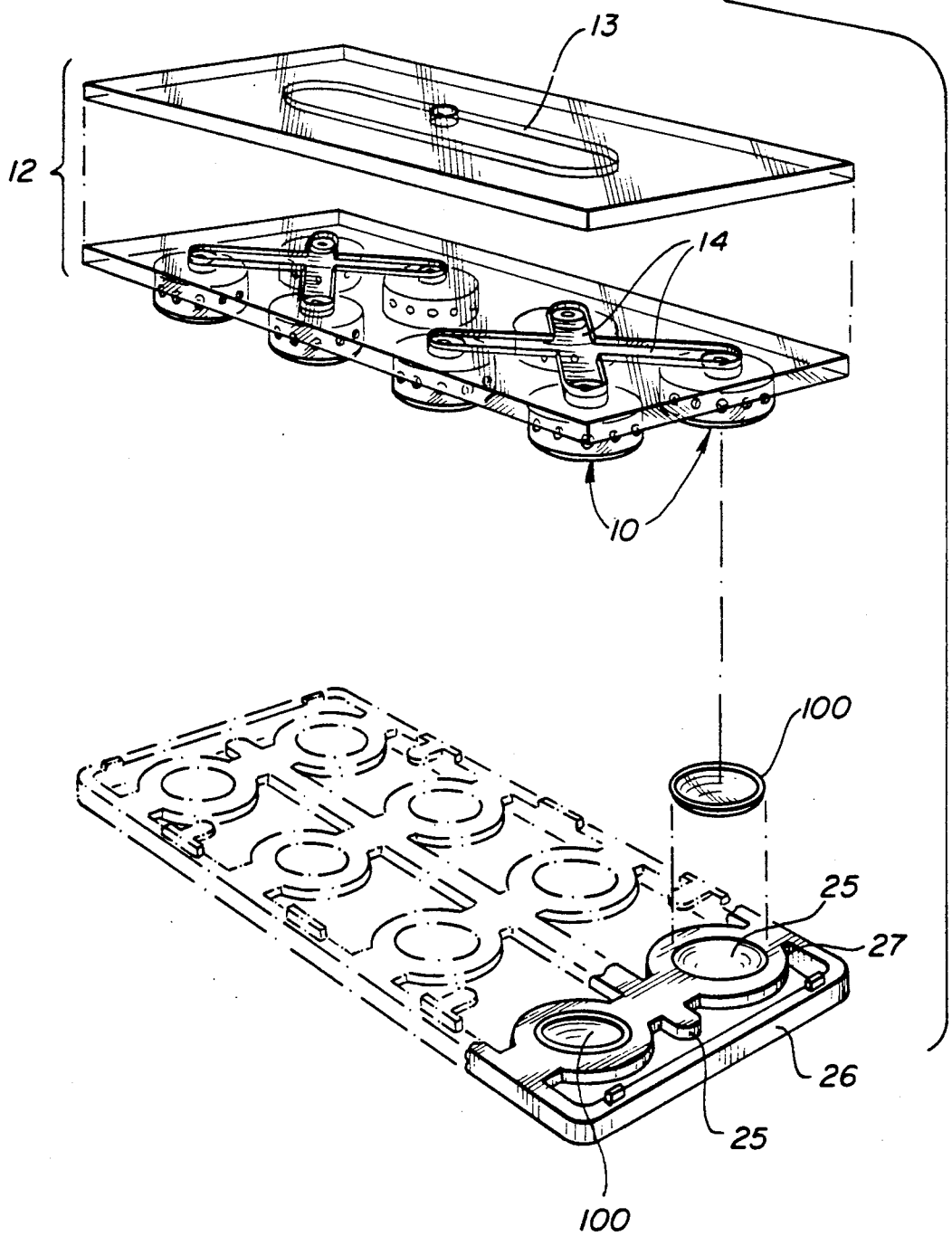
FIG. 1 is an exploded perspective view of a frame containing male chambers used to hold a plurality of polymerized contact lenses and the mold from which the lenses are formed at the point in production just before the hydration step.
Figure 2:
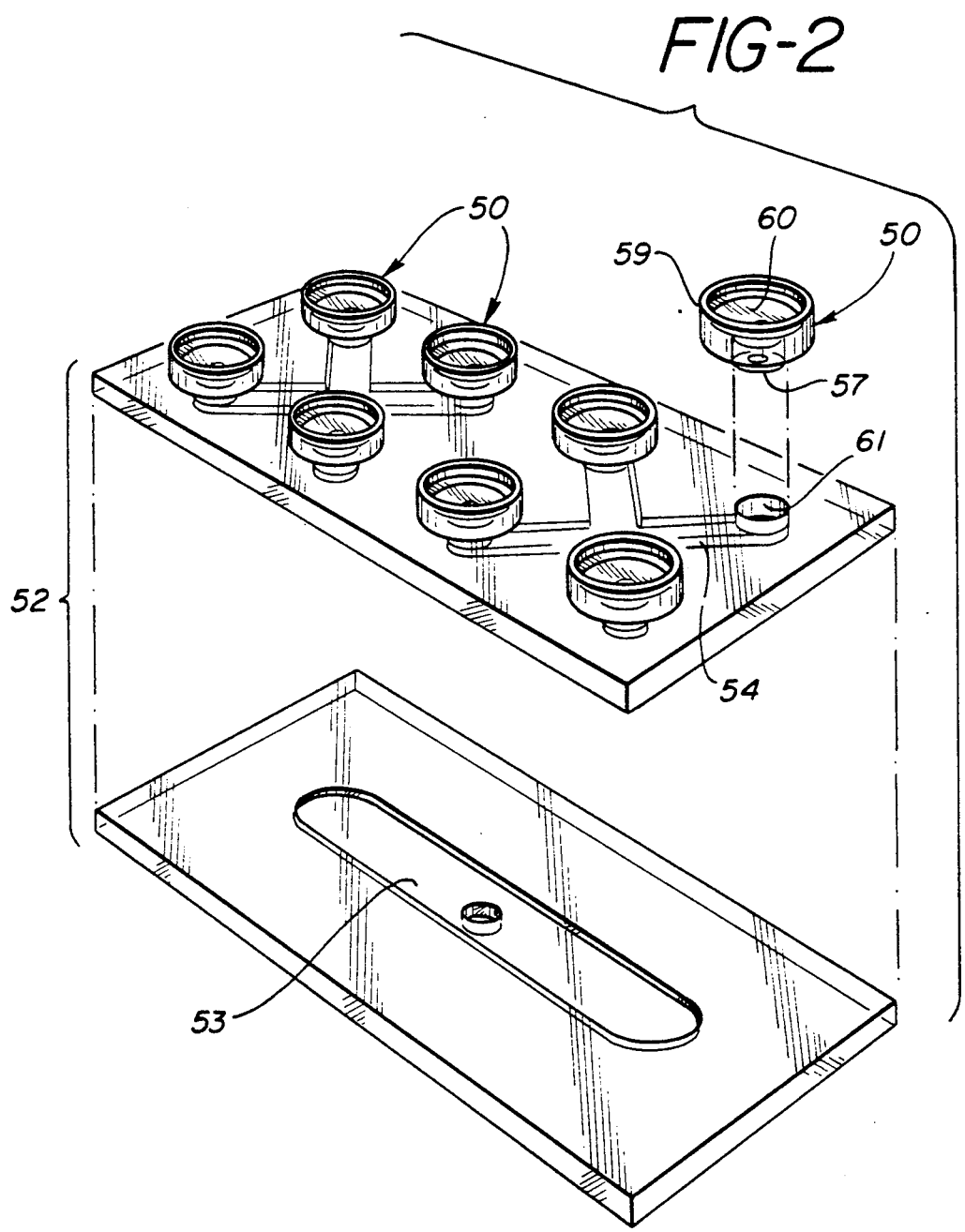
FIG. 2 is an exploded perspective view of the invention showing a frame containing female members for processing soft contact lenses during washing and hydration.
Figure 3:
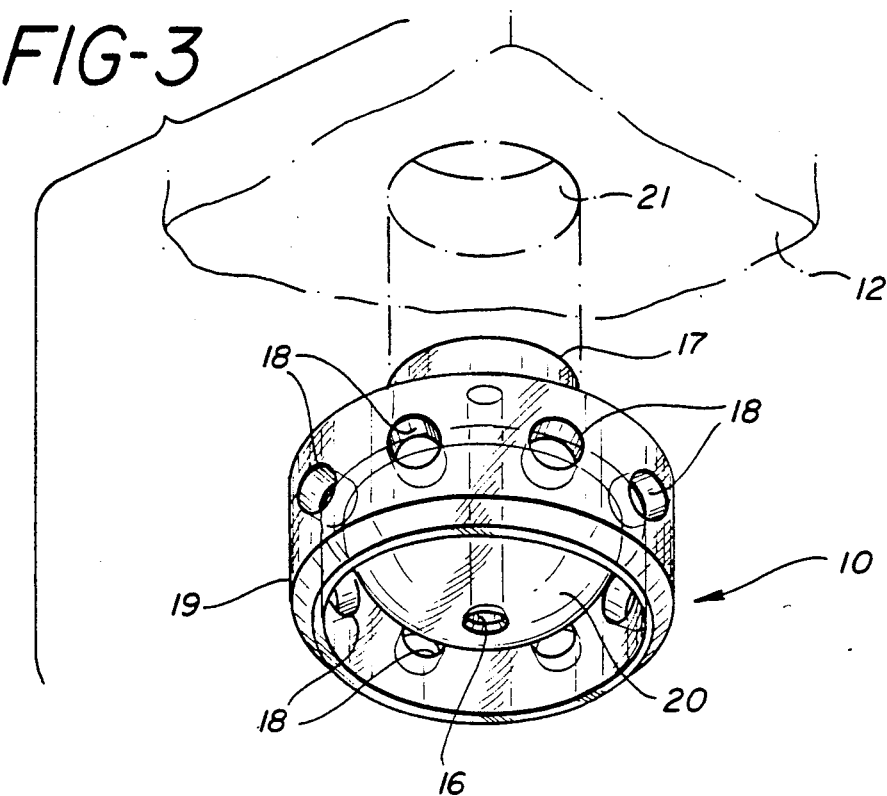
FIG. 3 is a perspective view of an individual male member.
Figure 4:
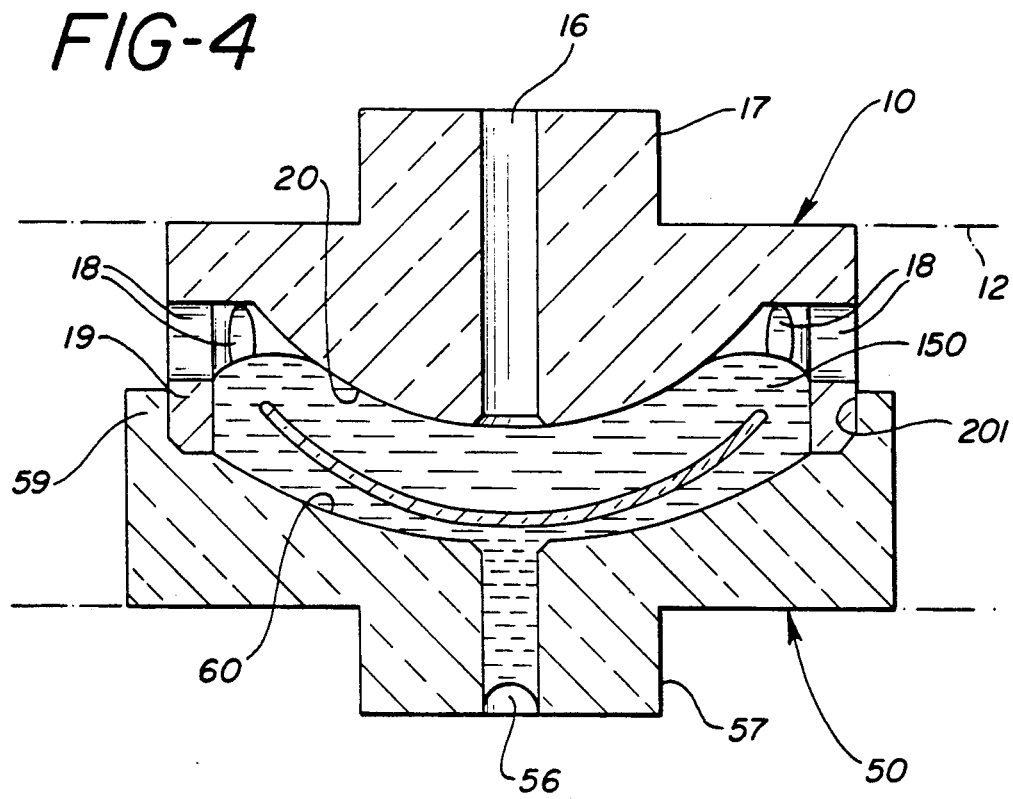
FIG. 4 is a cross-sectional view of one of the contact lens holding chambers of the invention.
Figure 5:
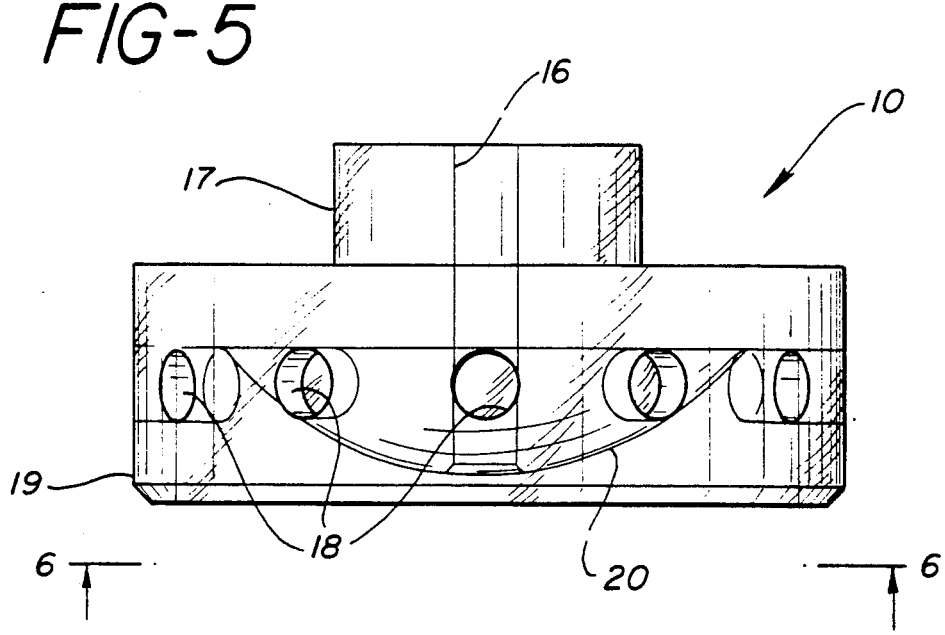
FIG. 5 is an elevation view of one of the male members of FIG. 3.
Figure 6:
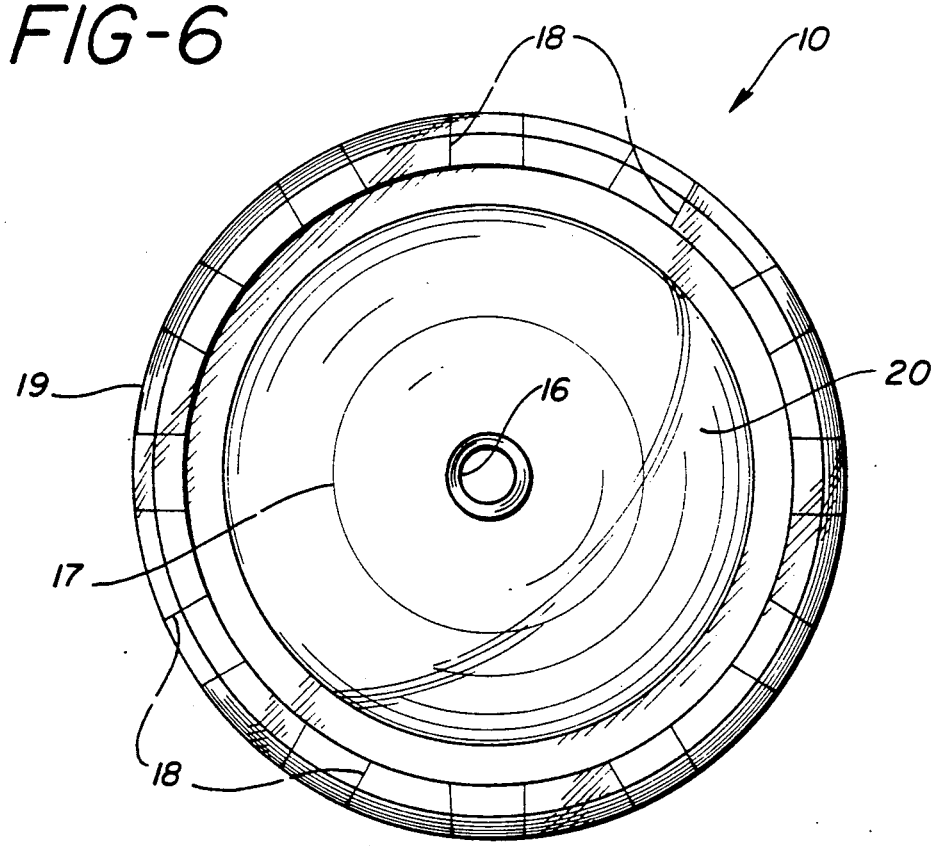
FIG. 6 is a bottom plan view of the member along lines 6—6 of FIG. 5.
Figure 7:
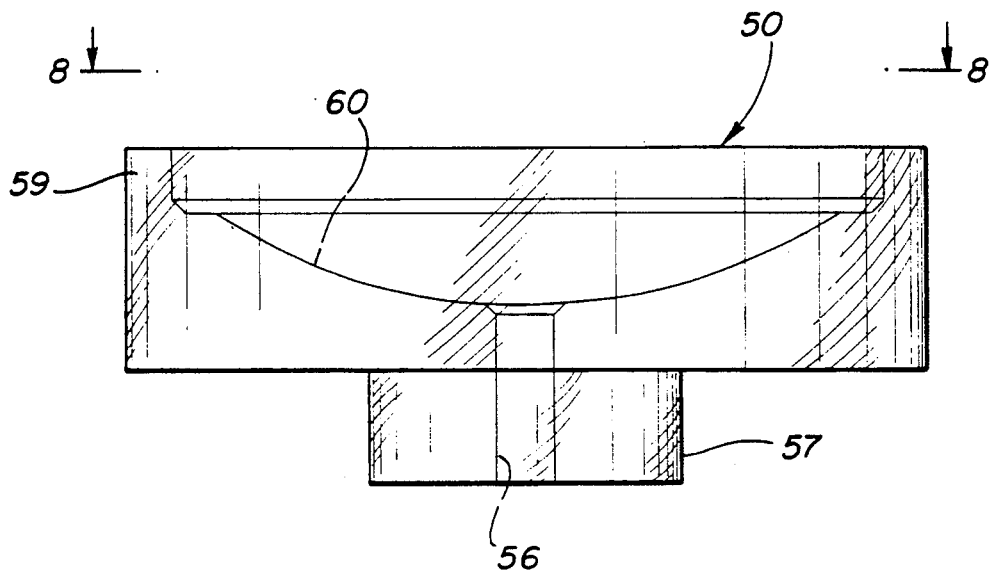
FIG. 7 is an elevation view of a female member in the frame of FIG. 2.
Figure 8:
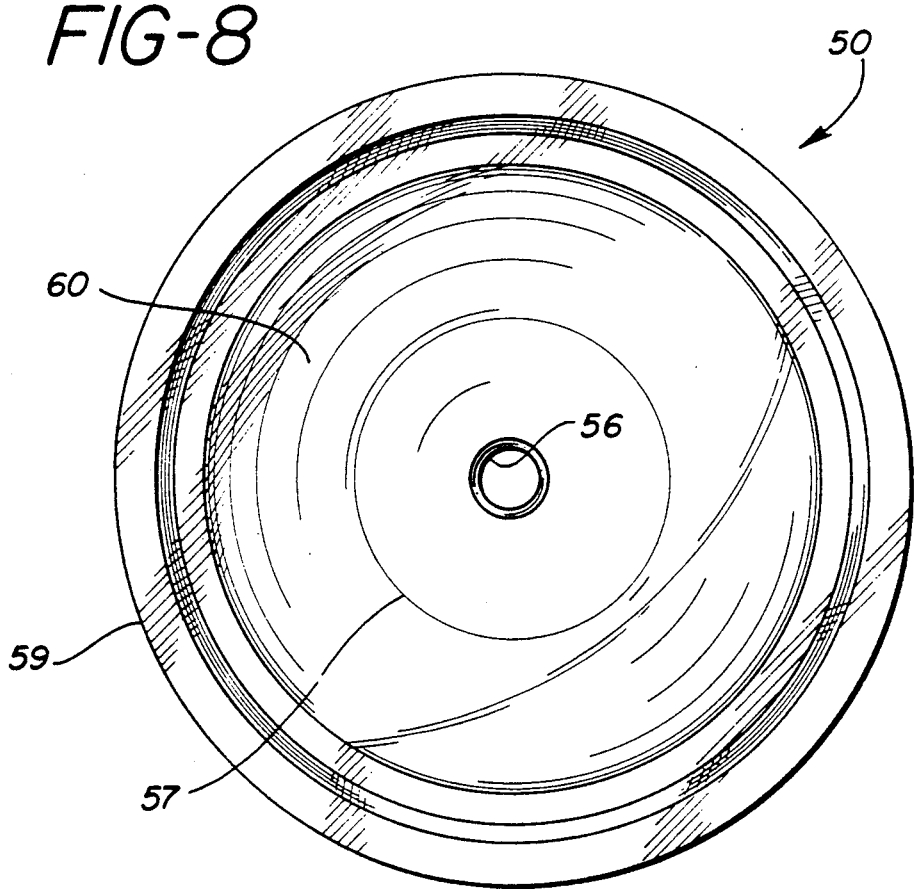
FIG. 8 is a top plan view of the member along lines 8—8 of FIG. 7.

Described in the Figures is the chamber of the invention which allows completion of the washing and hydration processes during the creation of soft contact lenses. As seen in FIG. 1, there is disclosed a particular chamber assembly design suitable for producing a plurality of contact lenses.

In FIG. 1, individual soft contact lenses (100) have been polymerized in concave mold units (25) and are placed symmetrically around one or more points which function as injection points (not shown) during the injection molding of chamber frame (26). For instance, the frame may contain four mold units placed symmetrically with respect to one point or more groups of four, each having a common injection point, which can be combined into one frame. Also, units of two, three, or five could be designed and combined as long as the frame does not get too large to handle.

Although the concave mold members in this step and the following processing steps can be used as separate units and not as a plurality held on a frame, it is preferred that they are initially held on a frame for more uniform processing and protection of the lens surface. Thus, the term "frame" as used in this description can mean any structural element which can hold a plurality of chambers or mold members, and allow their use in the present process.

As seen in a particular preferred version, frame (26) is shaped with thin walls, and molded into a rectangular shape. In the rectangular area two rows of two to six mold members (25) are positioned and held on the frame (26) by small struts (27, 28). The height of frame (26) is such that the surfaces of molds (25) are protected from scratching and mechanical damage during handling, and frame (26) in general has a shape facilitating stacking, processing and handling.

Figure 9:
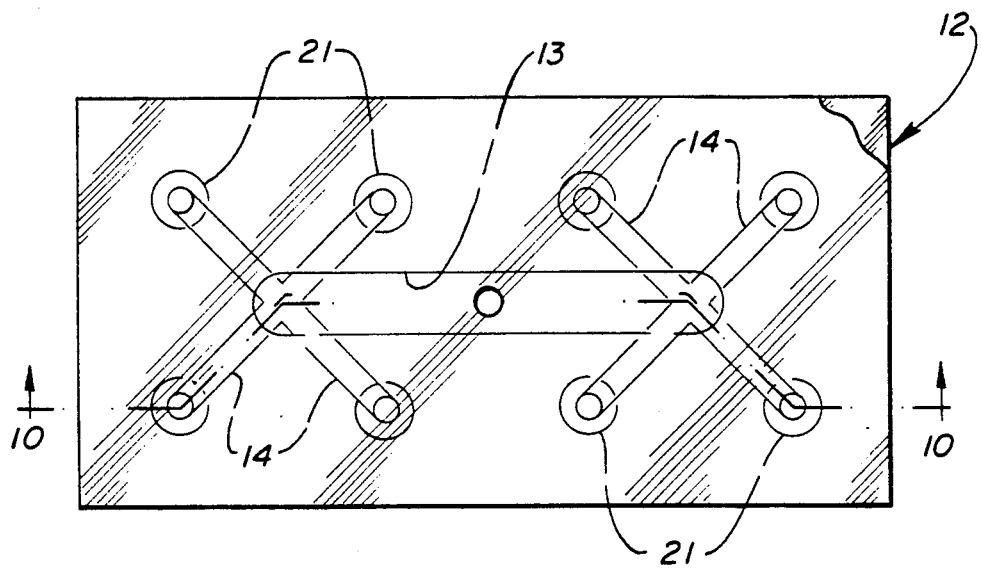
FIG. 9 is a top plan view of a frame for holding members as in FIGS. 1 and 2.
Figure 10:
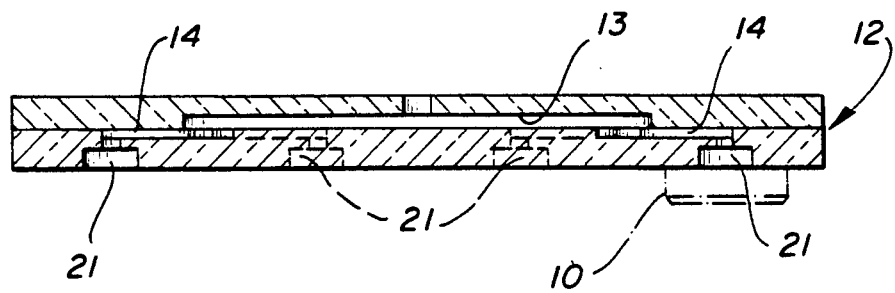
FIG. 10 is a side view in cross section along lines 10—10 of the frame of FIG. 9.

FIGS. 1, 3, 4, 5, 6, 9, 10, 11 and 12 disclose a frame of male convex members or chambers used during the washing and hydration process steps for soft contact lenses. As seen in FIGS. 1, 9 and 10, frame (12) contains a number of convex male chambers (10) which enclose the concave surface of contact lens (100). Each male chambers (10) connected to frame (12) is serviced by a flushing line (16), better seen in the cross-sectional views of FIG. 4. Each of these flushing lines (16) is in fluid contact with a hydrating line (14). These hydrating lines (14) are generally ribbed lines contained in frame (12) which are connected to a larger hydrating conduit (13), as seen in FIGS. 1 and 9. The currently preferred frame (12) contains eight male chambers (10) such that frame (12) is capable of being placed over the polymerizing molds (25) used during the polymerization process in forming the contact lenses (100).

As better seen in FIGS. 3, 4, 5 and 6, male chambers (10) each contain a convex lens surface (20) which mates with the concave surface of a contact lens (100. Each of the male chambers (10) has centrally located a flushing line (16) which provides fluid communication through convex lens surface (20). Each flushing line (16) is contained within cylindrical attachment (17). These cylindrical attachments (17) allow male chambers (10) to mate with frame (12), such that each flushing line (16) is maintained in fluid communication with a hydrating line (14). Accordingly, each of the cylindrical attachments (17) retains a press fit with an individual cylindrical mating means (21) formed as part of frame (12).

Through wall (19) of male chamber (10), there extends a plurality of radial exit holes (18). Currently the preferred number of exit holes (18) is twelve, but it is understood that this number is not critical. There must be a sufficient number of holes (18) so as not to create dead spots in the flow and to permit fluid flow throughout cavity (150) formed by the confronting surface of the male chamber (10) and female chamber (50) when the two are assembled together. Each hole (18) must be small enough so that the lens cannot escape and large enough to let air bubbles escape easily; a hole diameter of about two millimeters (2 mm.) is suitable. Radial exit holes (18) are formed on wall (19) such that all the radial exit holes (18) are disposed on one side of lens surface (20).

As better seen in FIG. 2, 4, 7 and 8, each male members or chambers (10) has a corresponding set of female members or chambers (50) maintained on frame (52). Female chambers (50) each contain a radially centered flushing line (56) and a concave lens surface (60), which has a slightly larger radius of curvature than that of the convex lens surface of a contact lens (100), to allow lens (100) to be self-centering on concave surface (60) and to avoid having lens (100) stick to concave surface (60) by surface tension. Lens (100) is meant to fit so that radial wall (59) is just large enough to contain the lens when it has swelled to its maximum size on male mold (10). Wall 59 on female chamber (52) includes an inner surface (201) which interfits with the exterior surface of wall (19) of male member (10).

Each female chamber (50) contains cylindrical attachment (57) through which flushing lines (56) are centered. Each of these cylindrical attachments (57) mates with a set of cylindrical mating means (61) on frame (52). Thus, the cylindrical mating means (61) and cylindrical attachment means (57) cooperate in much the same manner as the cylindrical attachment means (17) and cylindrical mating means (21). Hydrating lines (54) and hydrating conduit (53) located in frame (52) are able to maintain fluid communication with flushing lines (56) located in each of the female chambers (50).

Each male chamber (10) and female chamber (50) as well as frames (12, 52) can be made from any plastic or other material which can maintain critical dimensions under the conditions employed during the hydration process. Each of these male and female chambers (10, 50), can thus be made from representative plastics, metal, ceramic, glass or similar material. Examples of suitable plastic materials include polystyrenes, polyolefins, acrylics, polycarbonates, polyacetal resins, polyacrylethers, polyacrylether sulfones, and nylons. The most preferred material is polycarbonate which can be machined or injection molded and can withstand the solvents and washing solution within the temperature range utilized.

Accordingly, during the process described in my co-pending application Ser. No. 07/510,325 entitled "Process for Hydrating Soft Contact Lenses," filed on Apr. 17, 1990 the entirety of which is incorporated by reference, the combined male or female members (10, 50), when assembled, form a cavity (150) to confine the lens (100) while it is washed and hydrated in a series of short steps by cycling fluids in and out of cavity (150) in desired sequence. The process can be conducted using an array of cavities (150) as shown particularly in FIGS. 1 and 2.

The current hydration process is accomplished as follows: After polymerization, the soft contact lenses (100) are left in mold units (25) of frame (26), as seen in FIG. 1. Frame (12) containing male chambers (10), is placed on frame (26), both are inverted, then submerged in a water tank so that each lens (100) floats free from mold units (25) and attaches to surface (20) of male chambers (10) when pulled out of the water. The radius of curvature of convex lens surface (20) is substantially the same as the concave surface of contact lens (100).

Thus, contact lens (100), a hydrogel can attach by surface tension to convex surface (20).

Then frame (26) is detached from frame (12), leaving each convex lens surfaces (20) of each male chambers (10) holding a lens (100). Frame (12) serves as an adequate transport vehicle for lens (100) after the lens is released from mold (25). In this way, male chamber (10) holds and transports lenses (100) on surface (20) independent of the existence of wall (19) or exit holes (18).

Mold frame (26) is removed from frame (12) and then frame (12) engages frame (52) such that each male chambers (10) engages a female member or chamber (50). Concave lens surfaces (20) and convex lens surfaces (60) are enclosed by walls (19, 59) to hold contact lens (100) within the cavity (150) formed by the chambers (10,50), seen in FIG. 4. Cavity (150) confines lens (100) so it is not able to invert. Lens (100) remains in cavity (150) throughout the remainder of the hydration process, resulting in a fully controlled system. Cavity (150) when holding a typical contact lens (100) requires about 0.8 milliliters of solution for the lens to be fully immersed, generally about 0.4 to 1.5 ml of solution, preferably about 0.5 to 1.0 ml. and most preferably 0.6 to 0.8 ml. By flushing the lens (100) in the cavity (150) and allowing lens (100) and solution to come to, or close to, equilibrium prior to each subsequent flush, a substantial savings over previous immersion techniques is achieved.

During the wash and hydration, a stream of washing or hydrating solution is fed through hydrating lines (14, 54) and through flushing lines (16, 56) of male chambers (10) and female chambers (50) into cavity (150). Solution exits through holes (18). The flow is radial on both the concave and convex surface of lens (100). The controlled flow on both sides of the lens also removes debris from the surfaces.

Figure 12:
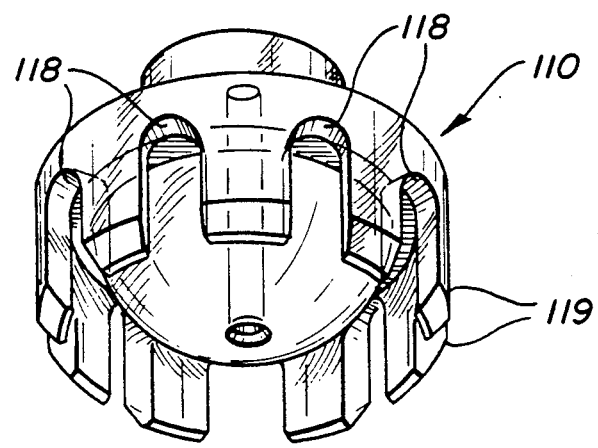

A further embodiment of the male chambers is seen in FIG. 12. Thus, in male chamber (110), instead of exit holes, there are seen exit slots (118) formed in wall (119). These exit slots (118) are spaced along wall (119) and facilitate flushing from alternate male mold (110) this is the most preferred embodiment because male chamber (110) is easy to mold.

Figure 11:
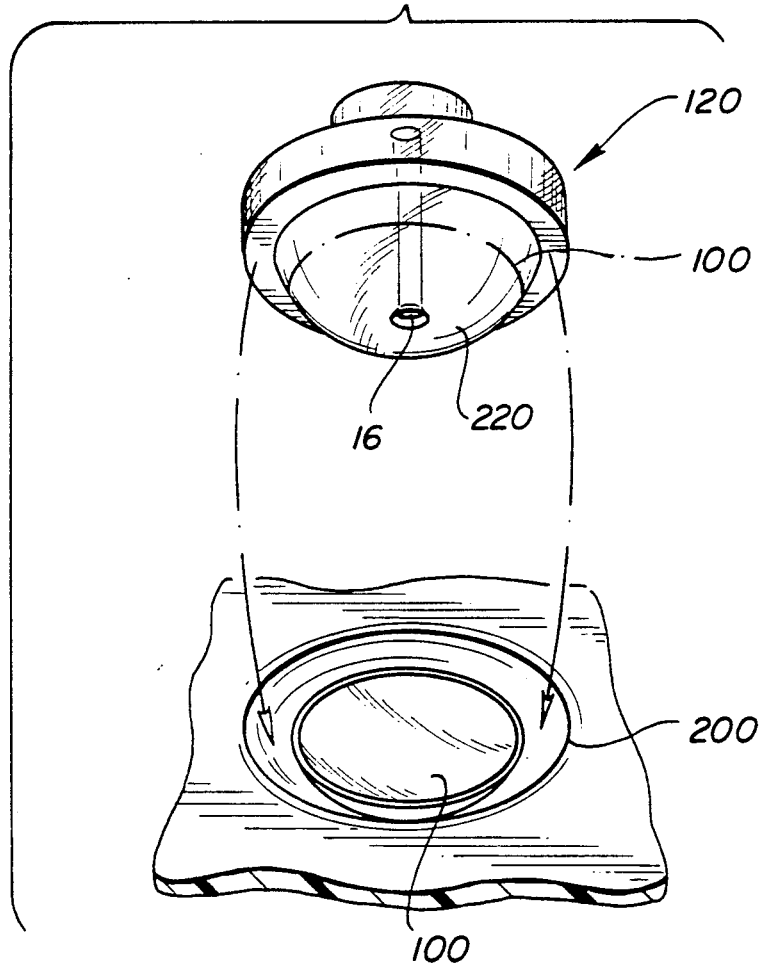
FIGS. 11 and 12 are perspective views of alternate embodiments of the male chamber of FIG. 3.

The hydrated lenses (100) are now ready for transfer and packaging. Lenses (100) are allowed to settle in the evacuated cavity (150) formed by chambers (10, 50) and then chambers (10, 50) are separated. Female chamber (50) now holds a properly oriented lens (100). As seen in FIG. 11, a new male chamber (120) with radial wall removed is placed over lens (100), so that surface (220) approaches lens (100).

As a separate transfer step, frame (52) is connected to a pressured air line. In this fashion, air is blown against the convex surfaces of contact lenses (100) through hydrating lines (54) and flushing lines (56). In this way, lens (100) is caused to attach to and be held on convex lens surface (220) of male chamber (120) by surface tension, much as occurred at lens release in the beginning of the hydration process.

Male chambers (120) containing lenses (100) are placed within a package. An example of a package (200) is further described in the accompanying co-pending application Ser. No. 07/510,325 entitled "Process for Hydrating Contact Lenses", filed on Apr. 17, 1990. From hydrating lines (14), an appropriate water solution is injected into the male chambers (120) through flushing lines (16). Accordingly, the lenses (100) are removed from the male chambers (120), once the level of water in each of the packages (200) is at least as high as the level of contact lenses (100) and the convex lens surfaces (20). This causes lenses (100) to float free from convex lens surfaces (20).

While in a package (200), lens (100) may be inspected and combined with a saline solution. The entire hydration process and transfer to package (200) may therefore take place in a fully automated fashion.

It will be understood that alternative aspects of the invention are possible. For instance, the entire process can be reversed. That is, the surfaces on which the lenses are carried may be concave, so that attachment is made at the convex lens surface. In addition, flushing or application of solvent or water may be made through the sides of the lens, although it is felt that flushing from the center of the lens radially is much more efficacious. This may also be accomplished through many central holes. Finally, the lenses can be transferred to a package such that the concave surface is facing down, instead of up out of the package as is presently seen.

What is most important, however, is that at all times lens (100) is controlled, and its orientation is maintained. All the chamber members and frames insure such proper control, and allow for a fully automated system. Because orientation and control of the lens is assured, without inversion, human interaction with the process becomes unnecessary.

What is desired, therefore, is to create a system that reduces lenses inversion during any step of the washing, hydration or packaging process. It is this feature which is accomplished by the present invention. Cavity (150), created between chambers (10, 50) maintains orientation of the lens (100). Also, male members (10) and packages (200) maintain the orientation. Washing and hydration takes place in a greatly reduced volume, which is only the volume used for flushing and the solution or solvent in chambers (10, 50). Because contact lens (100) maintains contact with the surface of a chamber or package at all transport steps in the process, full automation of the present system is achieved.

These and other objects of the present invention can described in the attached claims.

What is claimed is:

1. An apparatus for flushing a contact lens comprising:

a chamber defined by a pair of mating members, said mating members forming a cavity when mated for receiving said lens, said cavity inhibiting inversion of said lens when emplaced therein;

conduit means located on each of said mating members for introducing fluid into said chamber completely about said lens, said conduit means being centrally formed on each said mating member;

means for introducing a flow of said fluid between said members through said conduit means; and exit means for evacuating a fluid from said chamber located radially around said chamber, such that said lens is flushed radially on each side from its center when fluid is entered into said conduit means and evacuated from said exit means.

2. The apparatus of claim 1 wherein one of said mating members contains a projection located centrally within said chamber and said second mating member contains a recess located centrally within said chamber such that a lens having a concave surface and a convex surface is fit in said cavity with said projection proximal to said concave surface and said recess proximal to said convex surface.

3. The apparatus of claim 2 wherein said second member recess has a radius of curvature greater than that of the first member projection.

4. An apparatus for flushing a contact lens having a convex side and a concave side and a circumferential edge comprising:

mating members for receiving said lens, each of said mating members having a face generally conforming to one of said lens sides and a wall surrounding said edge, such that said faces and said walls define a cavity when mated, said cavity holding said lens to inhibit inversion of said lens emplaced therein;

each said mating member containing conduit means for introducing fluid through a said face; means for introducing a flow of said fluid between said members through said conduit means; and exit means being located on one of said walls in at least one of said members to evacuate fluid from said cavity.

5. The apparatus of claim 4 wherein said cavity becomes filled and said lens immersed in from about 0.4 to 1.5 milliliters fluid.

6. The apparatus of claim 4 wherein said cavity becomes filled and said lens immersed in from about 0.6 to 1.0 milliliters of fluid.

7. The apparatus of claim 4 wherein each said mating member is formed on a frame containing a plurality of said mating members.

8. The apparatus of claim 7 in which each mating member on one of said frames is formed to orient each lens formed within said chambers in the same direction.

9. The apparatus of claim 4 wherein said exit means contain a plurality of drainage holes located around said wall.

10. The apparatus of claim 9 wherein said holes are equidistantly spread around said wall.

11. The apparatus of claim 4 wherein said exit means contain a plurality of drainage slots located around said wall.

12. The apparatus of claim 11 wherein said slots are equidistantly spread around said wall.

13. The apparatus of claim 12 wherein said mating members contain cylindrical attachments opposite said faces, said conduit means passing through said attachments.

14. The apparatus of claim 13 wherein said cylindrical attachments of said mating members are attached to cylindrical components on a frame for holding said attachments.

15. A chamber for flushing a contact lens defined by a pair of mating holding means, one of said means having a concave side and the other means a convex side, comprising:

male holding means including a convex projection, a wall enclosing said convex projection and centrally located conduit means for transporting fluid through said male holding means to said concave side of said lens;

female holding means including a concave recess, a wall enclosing said concave recess and centrally located conduit means for transporting fluid through said female holding means to said convex side of said lens, one of said holding means engageable with the other to form a cavity by said walls and said convex projection and concave recess for confining a lens;

means for introducing a flow of said fluid between said members through said conduit means; and exit means located on at least one of said walls such that fluid is evacuated through said chamber at said exit means.

16. The chamber of claim 15 wherein both said holding means have cylindrical attachments connected thereto, said cylindrical attachments containing said conduit means, and connecting to receptacles on a frame, a first frame receiving a plurality of male holding means and a second frame receiving a plurality of female holding means.

17. The chamber of claim 16 wherein said means for introducing a flow of said fluid further comprises said frame containing a fluid line attaching to each said conduit means on said holding means.

18. The chamber of claim 16 wherein said exit means comprises a plurality of exit slots spaced from each other on the wall of one of said holding means.

19. The chamber of claim 16 wherein said conduit means causes the radial flushing of each said lens side with exit of fluid from said exit means.

* * * * *